United States Patent
Czerpak et al.

(10) Patent No.: US 11,128,732 B1
(45) Date of Patent: Sep. 21, 2021

(54) ADMISSION POLICIES FOR QUEUED WEBSITE VISITORS

(71) Applicant: Akamai Technologies Inc., Cambridge, MA (US)

(72) Inventors: Łukasz Czerpak, Cracow (PL); Eugene Zhang, San Jose, CA (US); Rajiv Ramnath, San Jose, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 17/009,591

(22) Filed: Sep. 1, 2020

Related U.S. Application Data (60) Provisional application No. 63/061,090, filed on Aug. 4, 2020.

(51) Int. Cl.
*G06Q 10/02* (2012.01)
*H04L 29/08* (2006.01)
*H04L 29/06* (2006.01)

(52) U.S. Cl.
CPC .............. *H04L 67/32* (2013.01); *H04L 67/02* (2013.01); *H04L 67/146* (2013.01); *H04L 67/42* (2013.01)

(58) Field of Classification Search
CPC ....... H04L 67/32; H04L 67/02; H04L 67/146; H04L 67/42; H04L 65/4084; G06Q 10/02; G06Q 30/0222; A63F 13/12; A63F 13/79; A63F 13/88; A63F 2300/6036
See application file for complete search history.

(56) References Cited

U.S. PATENT DOCUMENTS

| | | | |
|---|---|---|---|
| 5,572,643 A | 11/1996 | Judson | |
| 6,185,586 B1 | 2/2001 | Judson | |
| 6,457,025 B2 | 9/2002 | Judson | |
| 7,099,933 B1 | 8/2006 | Wallace et al. | |
| 7,200,681 B1 | 4/2007 | Tsimelzon et al. | |

(Continued)

FOREIGN PATENT DOCUMENTS

| | | |
|---|---|---|
| WO | 2005112389 A2 | 11/2005 |
| WO | 2005112389 A3 | 2/2006 |

(Continued)

OTHER PUBLICATIONS

"Akamai, Operations Handbook", Operations Handbook for Shopper Prioritization Application with First-in-First-out (FIFO) Selection, dated and available publicly Dec. 30, 2010, 53 pages.

(Continued)

*Primary Examiner* — Chirag R Patel (57) ABSTRACT

It is known in the art to mitigate load on website servers by providing a virtual waiting room where visitors queue. However, in currently known approaches, queue management is "unfair", in that a given visitor is not admitted to the website based on the order in which they arrived, but rather on a fixed probability each time they try to gain access. Disclosed herein are improved systems and methods for admitting visitors from the waiting room to the website. In embodiments, queued visitors may be admitted in accordance with a probability function that can be customized by an administrator to achieve queue fairness and/or can be adaptive to website load. The systems and methods disclosed herein are compatible with the RESTful nature of common web transactions.

11 Claims, 6 Drawing Sheets

(56) References Cited

U.S. PATENT DOCUMENTS

| | | | |
|---|---|---|---|
| 7,231,445 B1 | 6/2007 | Aweya et al. | |
| 7,240,100 B1 | 7/2007 | Wein et al. | |
| 7,734,815 B2 | 6/2010 | Leighton et al. | |
| 7,752,258 B2 | 7/2010 | Lewin et al. | |
| 8,166,079 B2 | 4/2012 | Lewin et al. | |
| 9,654,579 B2 | 5/2017 | Stevens et al. | |
| 9,667,747 B2 | 5/2017 | Shotton et al. | |
| 9,736,271 B2 | 8/2017 | Janardhan et al. | |
| 9,942,363 B2 | 4/2018 | Stevens et al. | |
| 2002/0059436 A1 | 5/2002 | Kubo | |
| 2003/0023724 A1 | 1/2003 | Martin et al. | |
| 2003/0023734 A1 | 1/2003 | Martin et al. | |
| 2006/0182249 A1* | 8/2006 | Archambault | H04L 12/1818 379/202.01 |
| 2007/0233291 A1* | 10/2007 | Herde | G06Q 10/02 700/91 |
| 2009/0280909 A1* | 11/2009 | McEniry | A63F 13/61 463/42 |
| 2016/0234264 A1* | 8/2016 | Coffman | H04L 65/4053 |
| 2017/0011179 A1* | 1/2017 | Arshad | G16H 40/20 |

FOREIGN PATENT DOCUMENTS

| | | | |
|---|---|---|---|
| WO | 2007105006 A1 | 9/2007 | |
| WO | 2012072690 A1 | 6/2012 | |
| WO | 2019063389 A1 | 4/2019 | |

OTHER PUBLICATIONS

"Amazon Simple Queue Service Developer Guide, 244 pages", Jun. 17, 2020 version according to WayBack machine, downloaded from https://web.archive.org/web/20200617185222/https://docs.aws.amazon.com/AWSSimpleQueueService/latest/SQSDeveloperGuide/sqs-dg.pdf.

"Cli-visitor-prioritization", 5 pages. Downloaded on Jul. 8, 2020. https://developer.akamai.com/cli/packages/visitor-prioritization.html.

"CrowdHandler, The Virtual Waiting Room", 12 pages, version as of Feb. 2020 according to web archive, downloaded on Sep. 1, 2020. https://web.archive.org/web/202000201225542/https://www.crowdhandler.com.

"How Queue-it Works", 4 pages. Downloaded on Aug. 6, 2020 but deemed publicly available as of Apr./May/Jun. 2020. https://queue-it.com/developers/how-queue-it-works/.

"How to achieve online fairness", 3 pages. Published on May 4, 2016, Downloaded on Aug. 6, 2020. https://queue-it.com/blog/achieve-online-fairness/.

"Is your sales website crash proof?" 7 pages. Available as of Jul. 30, 2019 according to Web Archive. downloaded on Sep. 1, 2020. https://web.archive.org/web/20190730203428/https://www.peakprotect.com.

"Market Insights Reports, Global Virtual Waiting Room", 3 pages. Published Mar. 2020. Downloaded on Sep. 1, 2020. https://www.marketinsightsreports.com/reports/03021864721/global-virtual-waiting-room-software-market-size-status-and-forecast-2020-2026.

"Queue-it Video", video and machine transcript, Jul. 8, 2020, 7 pages. https://www.youtube.com/watch?v=To9sEDzVdL4&feature=youtu.be.

"Section IO Website, Why and How We Built a First In First Out Virtual Waiting Room", downloaded on Sep. 1, 2020, but dated Jun. 3, 2020, 7 pages.

"Set Probability Percentage, ESI control file for Shopper Prioritization with First In First Out Selection", 2010, 1 page.

"Simple Queue web page", available as of Jun. 2019 according Web Archive, downloaded Aug. 18, 2020, 3 pages. https://www.simpleservers.co.uk/simple-queue Web Archive version at https://web.archive.org/web/20190627174150/https://www.simpleservers.co.uk/simple-queue.

"Simple Queue", downloaded on Aug. 18, 2020, 3 pages. https://www.simpleservers.co.uk/simple-queue.

"SPA 1.1 esi, Shopper Prioritization Application with First-in-First-out (FIFO) Selection", May 25, 2010, 2 pages.

"TrafficDefender Blog", downloaded on Aug. 18, 2020, 3 pages. https://www.trafficdefender.com/blog/.

"Virtual Waiting Room", downloaded on Aug. 18, 2020, 6 pages. https://www.trafficdefender.com/virtual-waiting-room/.

Visio-spa Workflows V4, diagram for Shopper Prioritization Application with First-in-First-out (FIFO) Selection, publicly available as of 2010, 6 pages.

"Visitor Prioritization Cloudlet—Waiting Room Template", downloaded Jul. 22, 2020 from https://control.akamai.com/dl/customers/Cloudlets/vpwaitingroom.zip.

"Visitor Prioritization Cloudlet Product Brief", 2 pages, downloaded Jul. 8, 2020 from https://www.akamai.com/us/en/multimedia/documents/product-brief/visitor-prioritization-cloudlet-product-brief.pdf.

"Waiting room | Fastly Developer Hub", available as of Apr. 2020, downloaded on Sep. 1, 2020, 15 pages. https://developer.fastly.com/solutions/patterns/waiting-room/.

"What is Visitor Prioritization?" 85 pages, downloaded on Jul. 13, 2020. https://learn.akamai.com/en-us/webhelp/visitor-prioritization/visitor-prioritization-guide/.

"Why CDN visitor prioritization doesn't cut it in ecommerce", published on Jul. 24, 2019. 6 pages, downloaded on Aug. 31, 2020. https://queue-it.com/blog/cdn-visitor-prioritization/.

PCT Search Report for application No. PCT/EP2011/071407, dated Aug. 2, 2012, 3 pages, published as WO2102/072690.

* cited by examiner

ADMISSION POLICIES FOR QUEUED WEBSITE VISITORS

This application is based on and claims the benefit of priority of U.S. Application No. 63/061,090, filed Aug. 4 2020, the contents of which are hereby incorporated by reference in their entirety.

BACKGROUND

Technical Field

This patent document generally relates to improved systems and methods for determining whether to admit a visitor to a website, particularly during times of website overload.

Brief Description of the Related Art

Surges in online traffic can overwhelm a website, leading to visitor abandonment or site failure. Websites have long been deployed behind content delivery networks (CDNs), which essentially provide a distributed set of reverse proxy servers managed by the CDN service provider. The CDN servers are designed to mitigate surges in load that would otherwise arrive at the origin infrastructure. This offload function is accomplished in significant part by having the CDN servers respond to client content requests with items directly from their caches, where possible. But sometimes it is still necessary to contact an origin server to obtain fresh content or content that is designated as un-cacheable. Visitors to an e-commerce website, for example, might need to interact with one or more web applications and associated back-end database(s) running on the origin infrastructure. These systems may facilitate personalized login, shopping and checkout/payment processes. Such transactions can be proxied through the CDN servers, and certain optimizations applied, but nevertheless the origin can become overloaded.

To address the problem of potential overload, it is known in the art for CDNs to provide a virtual 'waiting room' function. One such prior art solution is called "Visitor Prioritization" and it is provided commercially by Akamai Technologies of Cambridge, Mass., USA.

The Visitor Prioritization solution enables website owners to provide a branded, virtual "waiting room" for website visitors. The waiting room helps to ensure that origin application delivery servers do not become overloaded. By spreading the load over time—and also admitting priority visitors sooner—the load on the origin can be handled more effectively and gracefully.

During times of normal load, website visitors arrive at the CDN proxy server and their content requests are directed to the origin application server for the website. During a traffic surge, visitors can be either directed to the origin application server, or directed to a waiting room. Typically, prioritized visitors are identified by a special cookie, and directed immediately to the origin application server. The waiting room is typically a branded web page—for example a page presenting the user with a logo, a company message, and/or an animated "hourglass" icon. This web page also includes (in code) an embedded refresh directive. For HTTP GET requests, this "auto-refresh" directive can occur via a META tag. For HTTP POST requests, this "auto-refresh" directive can be provided in Javascript, with hidden HTML form tags to preserve the original end user's POST. The directive causes the visitor's browser to refresh the page every so often (e.g., every 30 seconds, or other configured amount) and request the originally requested URL. This refresh is essentially another attempt to enter the actual website, and to leave the waiting room web page. Every time that the page refreshes, the visitor has a chance of leaving the waiting room and being admitted to the origin application server. The website owner can control the chance of leaving the waiting room as a configurable parameter, thus controlling the rate of new visitors.

Figure 1:
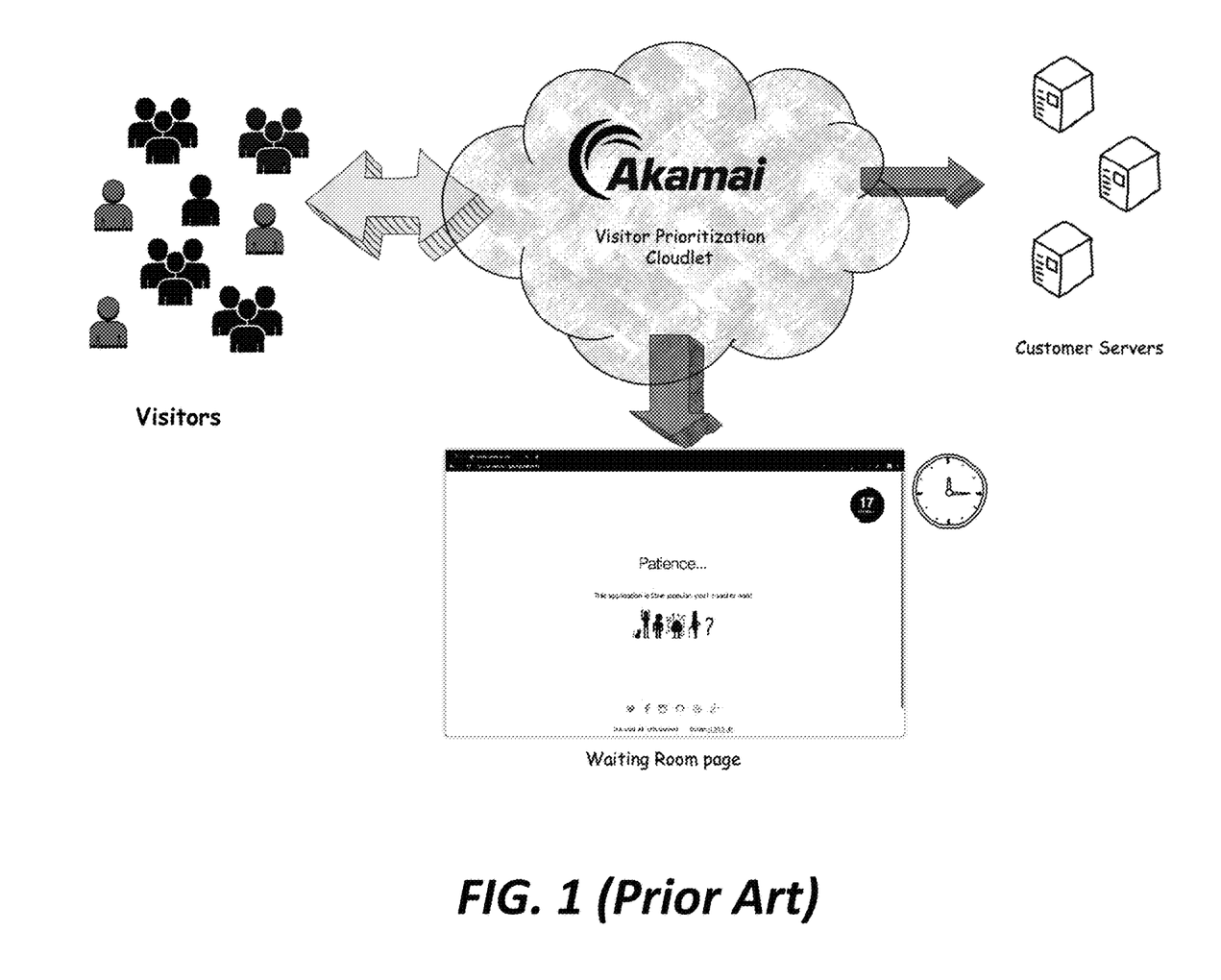
FIG. 1 is a diagram of the operation of a visitor prioritization as known in the prior art and described in the Background section.

FIG. 1 is a diagram illustrating the prior art solution just described. The Visitors (also known as 'end users') are shown on the left. (Note that visitor's client devices with browser user agents are not shown explicitly.) Though their browsers or other user agents, Visitors issue the content requests to the Customer Servers origin). The Visitor Prioritization cloudlet executes on the CDN servers that are helping to deliver the website for the CDN's Customers. In times of low load, the CDN server fetches the desired content from Customer Servers for the requesting Visitor. In times of high load on the Customer Servers, the CDN server can respond with the waiting room page depicted in FIG. 1. After some time period, the Visitor's user agent refreshes the page and again attempts to get desired content (e.g., the front page of a shopping cart or e-commerce promotion) from the Customer Servers.

Each time there is a refresh, the CDN server applies a static probability (%) configured for the origin, and calculates if the visitor (or more specifically, the request) falls within the probability. If so, the server issues a special session cookie ("Allowed User Cookie") to give the visitor's user agent a privilege to access to origin for the duration of the cookie's expiration date. But if not, then the visitor is not allowed access to the origin, so the system issues a special session cookie ("Waiting Room Cookie") to send the user to the waiting room page for the duration of the cookie's expiration date. (If the cookie is not expired on the next refresh, then the server will not admit it, thus preventing a user agent from requesting too fast.)

The value of the static probability is fetched using an ESI mechanism as described in U.S. Pat. Nos. 7,200,681, and 7,752,258, and 8,166,079. Or, using a dynamic control approach as described in U.S. Pat. No. 7,240,100, which is titled "Content delivery network (CDN) content server request handling mechanism with metadata framework support", and in U.S. Pat. No. 9,942,363 which is titled "Scalable content delivery network request handling mechanism to support a request processing layer", and in U.S. Pat. No. 9,736,271 which is titled "Scalable content delivery network request handling mechanism with usage-based billing", and in U.S. Pat. No. 9,667,747 titled "Scalable content delivery network request handling mechanism with support for dynamically-obtained content policies" and in U.S. Pat. No. 9,654,579 titled "Scalable content delivery network request handling mechanism".

In the current solution, a visitor's chance of admission is configurable, but fixed. In other words, a given visitor might have a static 50% chance of being admitted each time they refresh. Because the same probability applies each time the waiting room page gets refreshed, a visitor could be stuck in the waiting room for multiple cycles with no increase in chances of admission. As a result, the waiting room queue is said to be "unfair", as it does not enforce an admission order based on the order in which visitors first tried to access the website.

It is desirable to provide a "fair" queuing and admission system for website visitor prioritization and waiting room functions, in which visitors of the same priority are admitted in relation to the order in which they arrived. Visitors in the waiting room should be admitted before visitors who arrive after they did, if desired. Moreover, it is desirable to provide a system that enables improved control over visitor traffic and enables granular adjustments to the admission of the visitors based on origin load, in order to optimize website function, efficiency, network traffic, and user experience.

WO 2012/072690 A1 discloses a "fair" queuing and admission system in which a visitor is directed to a separate queue system, where it is assigned a queue identifier in a centrally managed queue. When the visitor reaches the front of the line, the visitor is redirected to the website. However, this approach does not scale well and requires an entirely separate queuing system. It is desirable to provide queuing and admission systems that are not only "fair" but also address such technical problems.

The teachings hereof address these technical problems, among others, and provide a variety of technical benefits and advantages that will be apparent from the accompanying description.

As noted, the teachings hereof improve the efficiency, flexibility and operation of websites. The foregoing has outlined some pertinent features of the teachings of this document, but they are not limiting. The claims define the scope of the invention captured by this patent document.

BRIEF SUMMARY

It is known in the art to mitigate load on website servers by providing a virtual waiting room web page, where visitors queue. However, in currently known approaches, queue management is "unfair", in that a given visitor is not admitted to the website based on the order in which they arrived, but rather on a fixed probability each time they try to gain access. Disclosed herein are improved systems and methods for admitting visitors from the waiting room to the website. In embodiments, queued visitors may be admitted in accordance with a probability function that can be customized by an administrator to achieve queue fairness and/or can be adaptive to website load. The systems and methods disclosed herein are compatible with the RESTful nature of common web transactions.

The foregoing is merely an overview of certain aspects of the invention. The claims define the scope of the protection that is afforded by this patent document. The claims are incorporated by reference into this Brief Summary.

BRIEF DESCRIPTION OF THE DRAWINGS

The invention will be more fully understood from the following detailed description taken in conjunction with the accompanying drawings, in which.

Numerical labels are provided in some FIGURES solely to assist in identifying components being described in the text; no significance should be attributed to the numbering unless expressly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this document and illustrated in the accompanying drawings are non-limiting examples; the claims define the scope of protection that is sought. The features described or illustrated in connection with one embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, HTTP versions 1.1 and 2, HTTP over QUIC, TCP/IP, and UDP, is assumed.

All references to HTTP should be interpreted to include an embodiment using encryption (HTTP/S), such as when TLS secured connections are established. The terms "client" and "client device" are used herein to refer to hardware in combination with software (e.g., a browser or other user agent). While context may indicate the hardware or the software exclusively, should such distinction be appropriate, the teachings hereof can be implemented in any combination of hardware and software. Hardware may be actual or virtualized.

The term "visitor" refers to an end-user employing a user agent to access resources over a network (e.g., a person using a browser or app running on a client device in order to visit a website).

With the foregoing by way of introduction, the teachings hereof are now presented in more detail.

Overview of System Operation and Function

Figure 2:
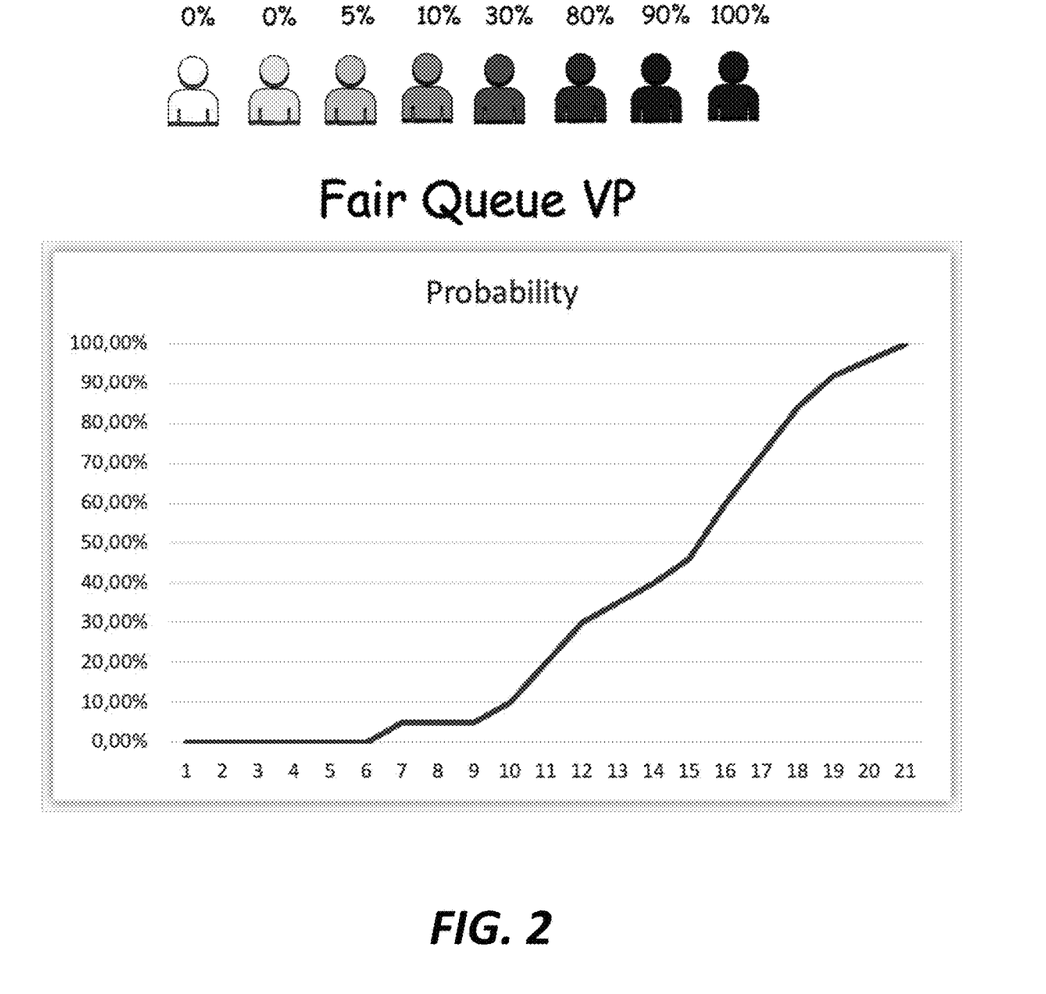
FIG. 2 is a diagram illustrating an example of a way that the improved solution described in this patent document can adjust the probability of a visitor gaining entrance to a website as a function of waiting time.

FIG. 2 is a diagram illustrating how an improved website queueing and admission system, as described herein, can increase a visitor's chance to access a website over time. The y-axis represents the probability of access on each request. In general, the values on the x-axis may be thought of as an indicator of the amount of time that a given visitor has waited after an initial request to access the website. This is referred to as a 'wait time indicator' in this patent document.

The 'wait time indicator' can be expressed using any of a variety of metrics. It could be expressed as clock time, with the x-axis values representing, e.g., the number of seconds that the visitor has been waiting since first trying. It could be expressed as the number of requests, with the x-axis values representing the number of requests that a given visitor has made, preferably with some mechanism to enforce a maximum request rate. It could be based on classifying a visitor into a segment, where the x-axis values represent segments of time.

In general, upon each attempt by a visitor to access a desired URL on the website a server determines the value of the wait time indicator for the requesting user agent and selects a probability function configured for that URL. The probability function is a function that relates the value of the wait time indicator to a probability of admission. Preferably the function is monotonically increasing—that is, increasing over time without decreasing, so as to enforce a "fair" queue for visitors.

Once the server determines the probability of admission, the server decides whether to admit the visitor. This can be accomplished in any way known in the art. For example, the server can generate a pseudo-random number (PRN) between two values, e.g., between 0 and 100. If the probability is 70% admission, then if the PRN is between 0 and 70, the visitor is admitted, else it is sent back to the waiting room. This is but one example of an implementation, which reflects the technique used in the prior art Visitor Prioritization solution described in the Background. But those skilled in the art will understand that there are many others.

Upon granting admission, the server responds to the waiting room page refresh with desired content as identified by the originally requested URL, instead of the waiting room page. This is typically an HTML document defining the front page of the website, e.g. the front page of a shopping site or online promotion micro-site.

Denying admission typically means that the server causes the user agent to continue to display the waiting room web page. For example, the server can respond to the refresh request by serving the same waiting room page again, with the same embedded auto-refresh directives, thus starting the cycle over again.

Figure 3:
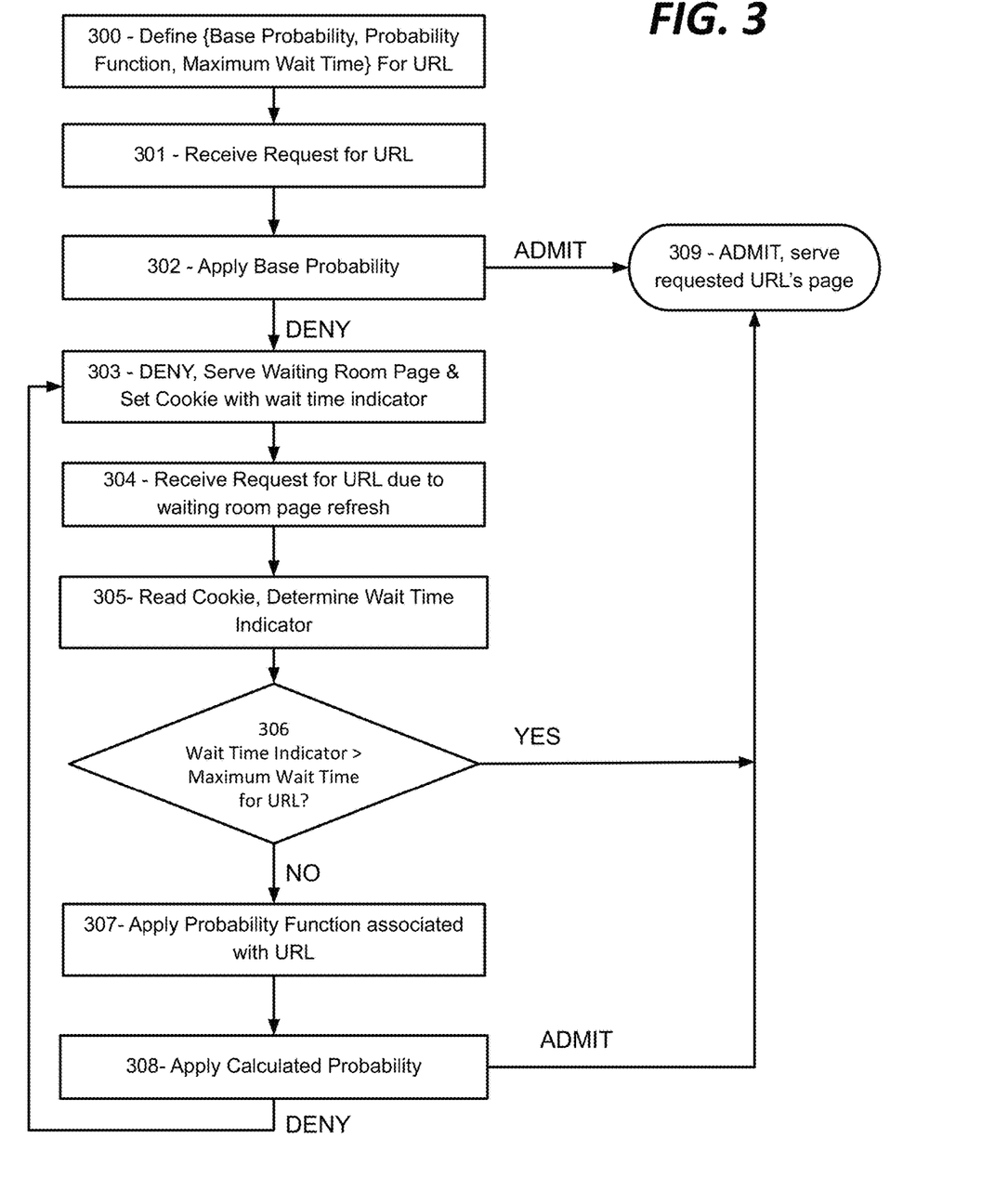
FIG. 3 is a flow diagram illustrating the steps involved in a method for improved website visitor queuing and admission, in accord with an embodiment of the teachings hereof.

FIG. 3 is a flow diagram illustrating the various steps just described. Assume the solution is implemented in a content delivery network (CDN) that is providing delivery for a given origin server through its distributed platform of CDN servers. At step 300 the administrator (e.g., the website owner or a CDN specialist) configures the CDN system with parameters. Alternatively, the CDN itself might generate and adjust certain of these parameters dynamically, as will be explained in more detail below. The configuration parameters can be distributed out to particular CDN servers using known configuration approaches, such that those described in U.S. Pat. No. 7,240,100, which is titled "Content delivery network (CDN) content server request handling mechanism with metadata framework support", and in U.S. Pat. No. 9,942,363 which is titled "Scalable content delivery network request handling mechanism to support a request processing layer", and in U.S. Pat. No. 9,736,271 which is titled "Scalable content delivery network request handling mechanism with usage-based billing", and in U.S. Pat. No. 9,667,747 titled "Scalable content delivery network request handling mechanism with support for dynamically-obtained content policies" and in U.S. Pat. No. 9,654,579 titled "Scalable content delivery network request handling mechanism". The contents of all of the foregoing patents are hereby incorporated by reference. The aforementioned ESI mechanism can also be used, as described in U.S. Pat. Nos. 7,200,681, and 7,752,258, and 8,166,079, the contents of which are hereby incorporated by reference.

At step 301, a given CDN server receives a request from a user agent running on a client device. The request is for content located under a particular URI, of a website, such as the home page of an e-commerce site. At step 302 the CDN server applies the configured base probability to determine whether to admit this visitor to the website. If the visitor is admitted, then control passes to block 309 at which the CDN server serves the HTML document associated with the requested URI. If the visitor is denied entry then at step 303 this CDN server provides the waiting room HTML document and sets a cookie with the wait time indicator stored therein. At step 304 the user agent sends another request for the URL due to the waiting room page refresh directive. At step 305 the CDN server receives this request, reads the cookie, and determines the value of the wait time indicator. At step 306 the CDN server checks whether the user agent has been waiting beyond the maximum weight time as configured in step 300. If so, then control passes to 309 and the visitor is admitted to the website. If not, then at step 307 the CDN server selects the probability function that was associated with the URL in step 300, and using the current wait time indicator as input to the selected function, calculates a probability of admission. At step 308 the CDN server applies the calculated probability to determine whether to admit the visitor at this time. If the user agent is admitted then control once again moves to 309 and the visitor is admitted. If the visitor is denied entry then the CDN server serves the waiting room page again and updates the cookie with an updated wait time indicator, cycling back to step 303.

More detail about aspects of the solution are now provided.

Wait Tune Indicator

The first time that a visitor's user agent requests a URL, the wait time is zero. As noted above, a CDN server selects a probability function and determines the probability of admission based thereon. If admission is denied, then the server sets a cookie on the user agent when it serves the waiting room page. The cookie stores the wait time indicator. Each time the user agent refreshes and is denied admission, the server can update the contents of the cookie to reflect additional waiting time.

Figure 4:
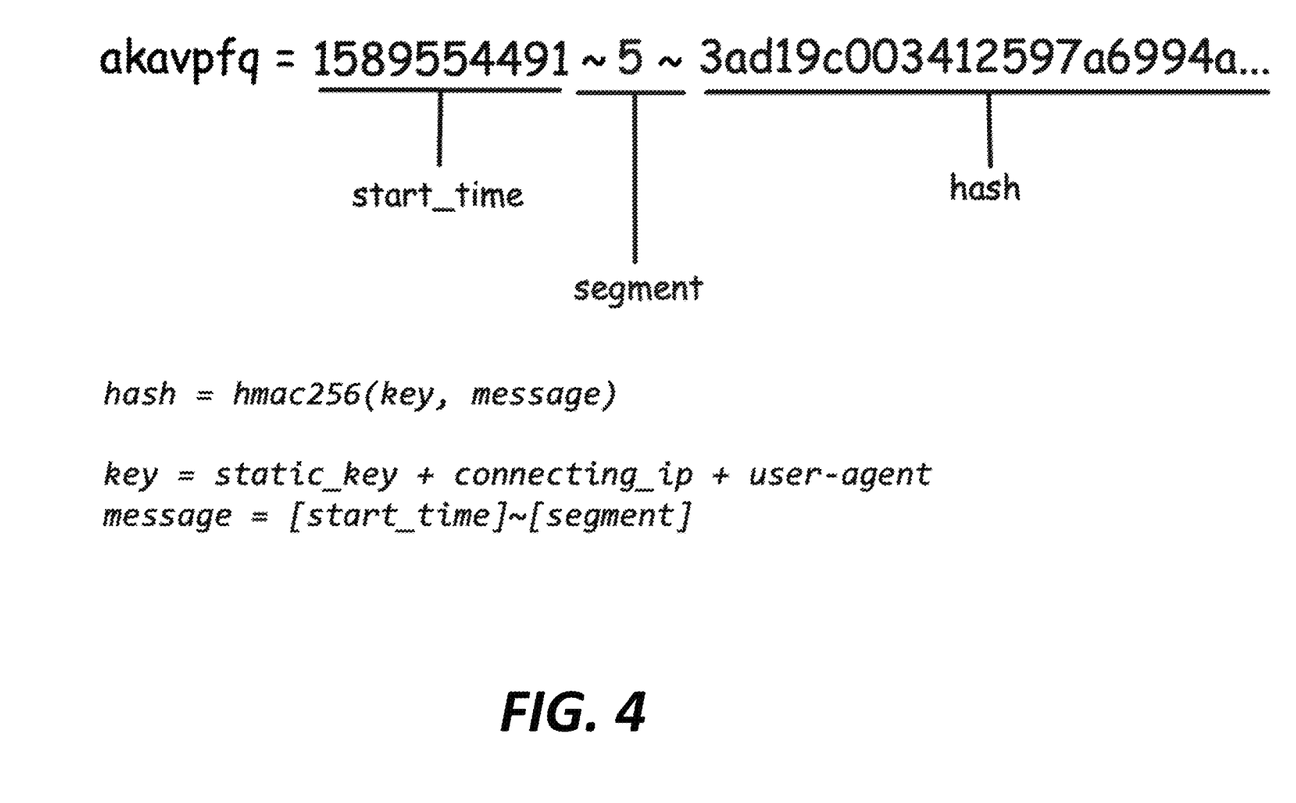
FIG. 4 illustrates an example of cookie's data fields, in accord with an embodiment of the teachings hereof.

FIG. 3 illustrates one possible format and structure for data in the cookie. In this example, the cookie is named 'akavpfw' (which refers to akamai-visitorprioritization-fair-queue). The cookie contains the following elements:

start_time: A timestamp indicating when the user agent first attempted to access the website (and was placed in the waiting room)

segment: The waiting time scale can be divided into a number of segments, reducing the computational effort and to relax requirements for clock synchronization in a distributed system. Segments are kept at a constant size when the solution is activated for a high load event. Each segment might represent for example 30 seconds of time, No matter how many times a user agent refreshes during a given segment, the system will keep that user agent in the same segment (this helps to mitigate high request user agents from jumping ahead in line).

hash: The cookie is crypto-signed with a key derived from User-Agent and Connecting-IP. This is the hash shown in FIG. 4. It is a security mechanism that authenticates the contents of the cookie and ensures they have not been tampered with. Many such approaches are known in the art and the teachings hereof may use any of them.

Figure 5:
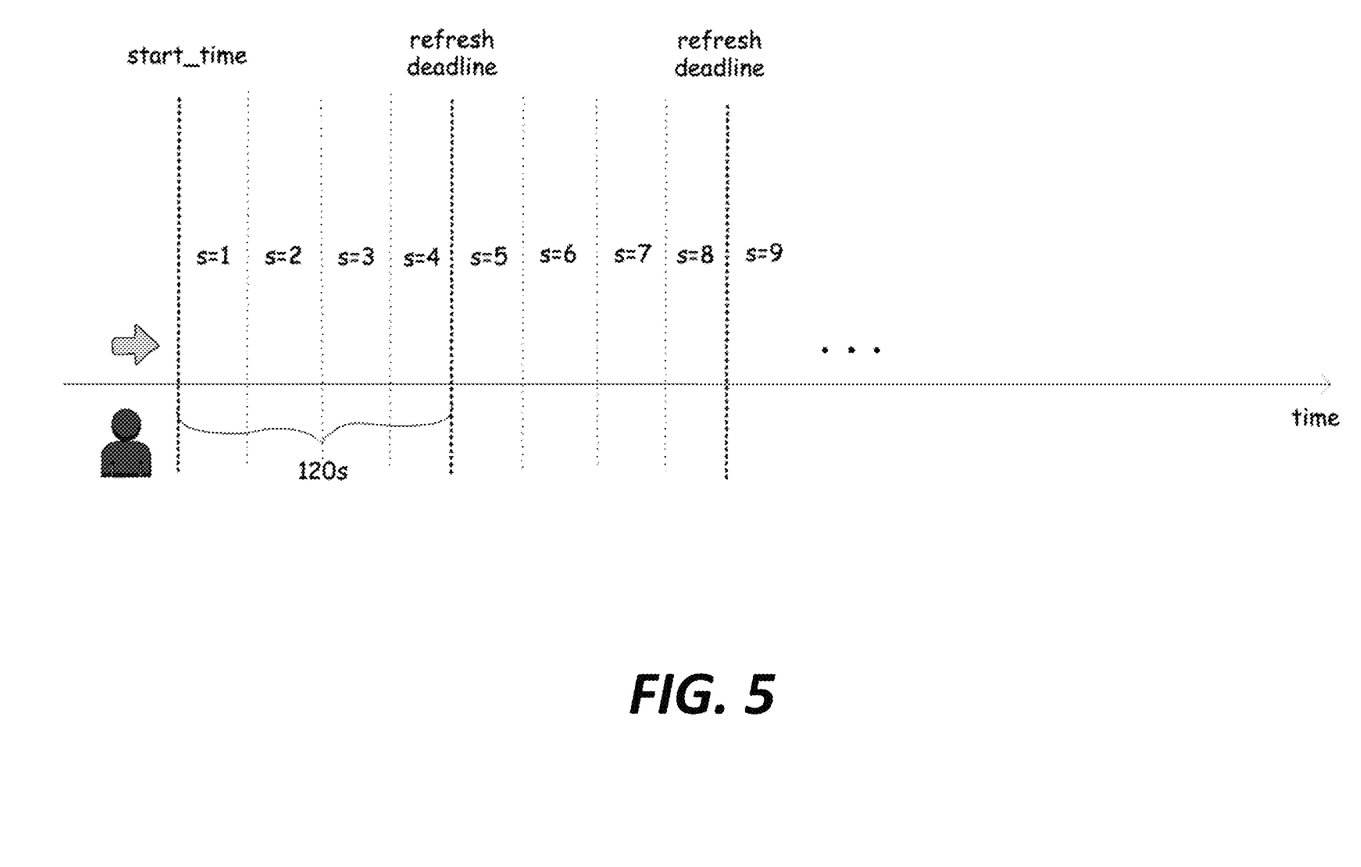
FIG. 5 illustrates the purpose and relationship of the data fields stored in the cookie of FIG. 4, in accord with an embodiment of the teachings hereof; and, FIG. 6 is a block diagram illustrating hardware in a computer system that may be used to implement the teachings hereof.

FIG. 5 illustrates the relationship amongst the data fields described above. A given visitor arrives in the waiting room at the start_time. The x-axis is divided into time periods "s", which stands for "segment". In this example, each segment is 30 seconds. The "refresh deadline" is the lifetime of the cookie, in this case, 120 seconds. If a user agent presents the cookie after this time, it will be treated as stale. This means that the user agent must refresh within 120 seconds, or it starts over again with a new cookie with the initial segment. The refresh deadline is preferably larger than the waiting room page's refresh period, giving a safety margin in case the user agent experiences network problems or other glitches causing it to miss a refresh or two.

Conversely, if the user agent tries to refresh too fast, that is, multiple times within the time period of a segment, the server will not advance the segment number stored in the cookie. As noted earlier, this protects against user agents (such as bots) trying to move forward in the queue by using high request rates.

The waiting room page's refresh period is not shown in FIG. 5. The waiting room page's refresh period can be equal to the segment size (30 seconds), as a faster refresh rate will not advance the user agent to a new segment. But the refresh period and segment size do not need to be exactly equal.

A process for updating the contents of a cookie to advance a given user agent along the segments is now described. When a server receives a refresh request with a cookie from a visitor's user agent, it verifies the hash to ensure authenticity, and assuming so, the server checks to see if the cookie is stale. This can be determined by the following calculation:

current_time−(start_time+segment_size×segment_from_user_cookie)<refresh_deadline If the cookie is stale, then the visitor must start over again. Hence, a new cookie is stored, with a new start_time equal to the current_time, and segment=1.

If the cookie is not stale, the server checks to see whether at least one segment time period has passed since the segment in the cookie was updated. In other words, the server checks to ensure that the user agent has waited for at least the time period of a segment. Hence, the server updates the cookie only if the current_time on server does not belong to the following time window:

time_window=(start_time_current_segment)−(start_time_next_segment)

start_time_current_segment=(start_time+segment_size×segment_from_user_cookie)

start_time_next_segment=(start_time+segment_size×(segment_from_user_cookie+1))

For example, based on FIG. 5, and using a refresh period of 30 seconds, if the server's current_time at refresh is 25 seconds beyond the start_time, then the cookie is not updated and the segment remains segment=1. If the current_time were 35 seconds beyond the start time, then the server would update the cookie with segment=2.

It should be understood that the use of a cookie to store waiting state is just one example. Any mechanism to store client state can be used, although preferably it is stored client side. For example, the waiting room page can use local storage in a browser-based user agent, and exchange data with the server using request/response headers with Javascript Web Tokens (JWTs). The JWT can hold the same data fields as identified above in the cookie, and can be cryptographically signed using known methods.

Configuration Parameters

The solution is parameterized with a base probability, a maximum wait time, and a probability function. Preferably, the number of segments is also an adjustable parameter, though the ability to adjust this parameter may be available only to the CDN administrators.

The base probability is the initial chance of a visitor reaching a website (e.g., on the initial attempt). The maximum wait time guarantees that a visitor will not be stuck in the wait room beyond that time, and thus ensures a certain level of user experience. The probability function may take many forms. As noted previously, the purpose of the probability function is to relate to the amount of time a visitor has been waiting (more specifically, the value of the wait time indicator) to a probability for admitting that visitor. Probability function examples are described in more detail in the illustrations in the next section. Finally, the number of segments may be adjusted by the website owner but is preferably bounded by the CDN service provider to bound the computational load of the solution.

Generally speaking there are several different ways in which the configuration parameters can be defined and used by an administrator. (The term 'administrator' here refers to any individual, e.g., a CDN administrator, or a website owner utilizing a user interface or API provided by the CDN, or combination thereof). Various illustrative scenarios are now provided.

Time-Based Configuration and Probability

First, an administrator can define the maximum waiting time, so as to bound the visitor's waiting time and ensure they won't get stuck. In this approach, the CDN server stores the visitor's start time, which is when they first entered the queue, in the cookie. The current system time (at a waiting room refresh) is then used to calculate the value of the wait time indicator.

The probability function can be defined by an administrator selecting from amongst a set of predefined, commonly used functions. Such functions might include a linear function that increases from the specified base probability (e.g., 0%) at the start_time to 100% at a maximum wait time. A base probability of zero is reasonable in many cases, as it forces newly arriving visitors to wait for a defined number of segments; it also enables provides some leeway for the website event administrators to see traffic reports and assess if defined max_wait_time is large enough for the event, because a high traffic event may require longer queue and thus a higher max_wait_time.

To further simplify setup for the administrator, there could be a default probability function, e.g., based on the CDN's past experience with websites in general or with the particular website in question. In this case, the administrator only has to select a base probability and maximum wait time, and the system generates a default probability curve (e.g., a linear increase, exponential etc.) between those two points.

For example, assume a linear function and that the maximum wait time is 10 minutes (such value can be configured in the server using the dynamic control approach specified in U.S. Pat. No. 9,667,747), If a visitor enters the waiting room and reloads after 1 minute 30 seconds, we can give it 15% probability to exit. If the max_wait time gets reduced to 5 minutes (because the web store is less busy), then the visitor can get a 30% probability to exit the waiting room and be admitted. Exponential or step functions, or virtually any kind of function could also be used. Specific functions are provided later in this document in the section titled "Examples of Probability Functions in General Form".

Advanced administrators could be allowed to freely customize and specify the probability function using a syntax accepted by the user interface. For example an administrator might enter P=(1.2)*(WTI) in a free-form entry field, where is probability in percent and WTI is the wait time indicator expressed in seconds, leading to 100% probability at 120 seconds).

Segment-Based Configuration and Probability

As noted earlier, the time axis can be divided into a series of time segments, each being, e.g., 30 seconds. Using the example of FIG. 5, an administrator can manually assign each segment a discrete probability value, until a desired maximum wait time is reached; at which point the probability of admission would be 100 percent. As a visitor progresses through segment numbers, they have the probability associated with the segment they are in. With this approach, the administrator has complete control over the shape of the probability curve.

Time segments can also be used with predefined probability functions provided by the system. An administrator only needs to define the base probability, select the function, and specify the maximum wait time.

Examples of Probability Functions in General Form

Some specific functions are now provided for illustrative purposes. In the examples below, assume that P=probability in percent; C and N are configured constants, WTI is the wait time indicator, BASE_P=is the base probability, and MAX_WAIT is the maximum waiting time.

Possible linear function:
For WTI=0, P=BASE_P;
For WTI>MAX_WAIT, P=100;
For all other values of WTI, P=C×(WTI)
Possible exponential function:
For WTI=0, P=BASE_P;
For WTI>MAX_WAIT, P=100;
For all other values of WTI, P=C×(WTI)$^N$
Possible logarithmic function (e.g., for faster ramp-up):
For WTI=0, P=BASE_P;
For WTI>MAX_WAIT, P=100;
For all other values of P=C×ln(WTI+1)

As those skilled in the art will appreciate, the wait time indicator and maximum waiting time can be expressed in segments of time, or in clock time (e.g., seconds, minutes). The configured constants simply need to be adapted for each situation.

Feedback Based Probability

In some embodiments, the probability function can be automatically generated and/or automatically adjusted by the CDN system based on dynamically changing network and origin server conditions. For example, the origin load can be measured and used as a signal to adjust the probability function. For example, assume an e-commerce site has a flash sale that generates a surge of online visitors. As load dissipates over a time period, the probability function can be adjusted to give visitors a higher chance of admission. The maximum wait time could be reduced, the function could be changed from linearly increasing to exponentially increasing, or the slope of the function could be increased.

As a more specific example, assume that the CDN server implements a function adjusting the maximum waiting time, as follows:

MAX_WAIT=USER_DEFINED_MAX_WAIT× LOAD_FACTOR.

and:
LOAD_FACTOR is float between from 0→n range where n>1.

Then, if LOAD_FACTOR=1, it means no adjustment. If LOAD_FACTOR<1 it means that the event got smaller traffic than usual. And if 1<LOAD_FACTOR<n, it means that the event got higher traffic than usual and CDN needs to throttle more aggressively.

The value of LOAD_FACTOR could be obtained from the origin periodically as part of a health check mechanism. It could also be an administrator setting in the solution to optionally set LOAD_FACTOR and this could be easily updated (even programmatically) via API or other user interface.

In some embodiments; the probability function itself could depend upon origin load. For example, assume an origin load metric LOAD_FACTOR is derived and normalized to a range 1→0, where 1 represents 80% of maximum load. Assume that this level of load is determined to be a level that necessitates the visitor prioritization solution. Assume further that in the range 1→0, 0 represents an overload or failure condition of the origin server. The previously presented probability function examples can be modified by scaling them according to the value of LOAD FACTOR:

Possible linear function:
For WTI=0, P=(BASE_P)×LOAD_FACTOR;
For WTI>MAX_WAIT, P=(100)×LOAD_FACTOR;
For all other values of WTI, P=C×(WTI)×LOAD_FACTOR
Possible exponential function:
For WTI=0; P=(BASE_P)×LOAD_FACTOR;
For WTI>MAX_WAIT, P=(100)×LOAD_FACTOR;
For all other values of WTI, P=C×(WTI)$^N$×LOAD_FACTOR Origin load can be reported to the CDN via a dedicated channel, or by known methods for the CDN to determine liveness or response time. It is known in the art, for example, for a CDN to periodically ping origin servers to test liveness, and to periodically request and download test objects to assess performance metrics like time to first byte, which can be correlated to load (see, e.g., U.S. Pat. No. 7,734,815, the content of which are incorporated by reference). Origin load can also be derived from analysis of logs of CDN servers indicating origin server performance, as the logs can indicate download time for an object along with its size. Of course, an administrator can also specify load manually.

Generalizing, a CDN can maintain a variety of segments-based probability functions (ranging from shallow to steep slope, or a different maximum waiting time). A CDN server can apply a selected function (selection based on the load feedback) to shape the waiting room visitor populations.

Selection of Probability Function at Request Tune

One feature of the improved solution is the ability to select a particular probability function at the time when a request for content from the web application (e.g., an HTTP GET or POST) is received from the visitor's user agent. Each website owner may have their own probability function defined in the CDN, which has to be selected depending on which website is being requested (e.g., by hostname). Moreover a particular probability function can be associated with a particular URL or a particular hostname or particular path URL path.

Generalizing, the selection of the probability function can be based on any attribute known at request time, such as the domain name of the website to which the visitor seeks access (indicated, e.g., by hostname in the GET request), characteristics of the client request, and/or pathname or other URL attributes. As already discussed, the selection can also be based on real-time measured origin load.

The server's selection of a probability function may also be based on characteristics of the requesting user agent. For example, the visitor prioritization solution can be coupled with an automated user agent ("bot") detection solution, such as that currently available commercially from Akamai Technologies. While of course a detected bot can be blocked, oftentimes bot detection algorithms produce not absolute conclusions but rather confidence scores. If the confidence score is below a configured threshold (i.e., it "might be" a bot), then instead of blocking the user agent and risking that it was falsely identified as a bot, the CDN server can select a probability function that is likely to give the suspected bot a longer wait time. This effectively moves suspected bots to the back of the queue, but still admits them if they continue to refresh, in case they are real human visitors.

It is noted that the teachings hereof naturally provide some mitigation of the effects of bots even without selecting amongst different probability functions. The probability function and tracking of wait time mean that a retry action to artificially increase a user agent's chances for admission is less likely to be successful. This helps mitigate the effect of automated user agents that issue machine generated requests to enter a website at a high rate, as the chance of admission is based on wait time, not request rate. This is useful for ticketing or reservation sites.

Characteristics and Potential Benefits

The teachings hereof can be used to enforce a fair queueing mechanism in a website's visitor prioritization and waiting room solution. The solution can require users to keep connected and refreshing.

The teachings hereof may be deployed in a multi-tenant CDN environment. However, it should be understood that while particular examples herein have been presented with respect to a CDN, that is not a limitation of the teachings hereof. The teachings hereof can be applied in any distributed computing system, and/or integrated into a web server as a front-end module, or otherwise. Many other variants will be apparent to those skilled in the art based on this patent document.

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 6:
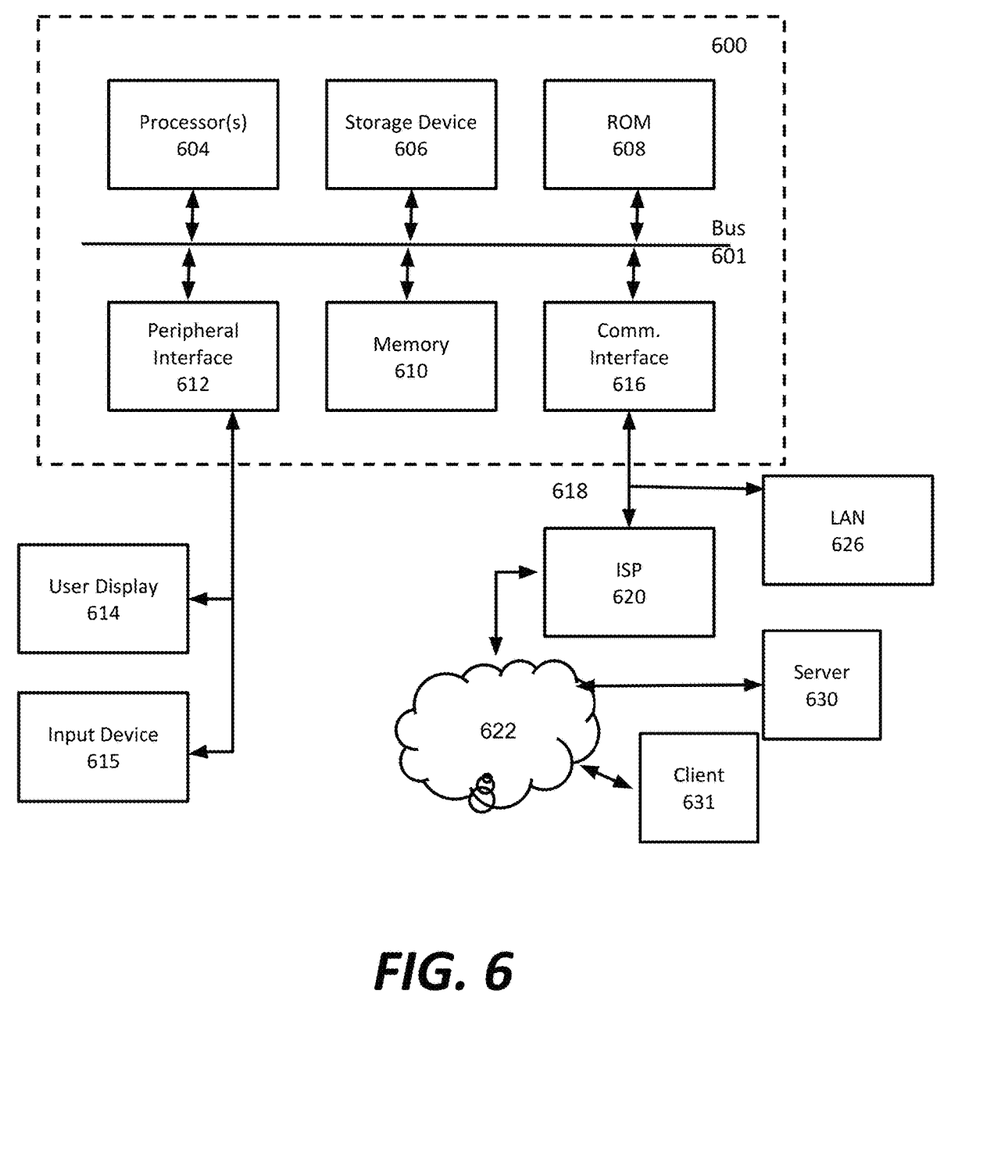

FIG. 6 is a block diagram that illustrates hardware in a computer system 600 upon which such software may run in order to implement embodiments of the invention. The computer system 600 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 600 includes a microprocessor 604 coupled to bus 601. In some systems, multiple processor and/or processor cores may be employed. Computer system 600 further includes a main memory 610, such as a random access memory (RAM) or other storage device, coupled to the bus 601 for storing information and instructions to be executed by processor 604. A read only memory (RUM) 608 is coupled to the bus 601 for storing information and instructions for processor 604. A non-volatile storage device 606, such as a magnetic disk, solid state memory (e.g., flash memory), or optical disk, is provided and coupled to bus 601 for storing information and instructions. Other application-specific integrated circuits (ASICs), field programmable gate arrays (FPGAs) or circuitry may be included in the computer system 600 to perform functions described herein.

A peripheral interface 612 may be provided to communicatively couple computer system 600 to a user display 614 that displays the output of software executing on the computer system, and an input device 615 (e.g., a keyboard, mouse, trackpad, touchscreen) that communicates user input and instructions to the computer system 600. However, in many embodiments, a computer system 600 may not have a user interface beyond a network port, e.g., in the case of a server in a rack. The peripheral interface 612 may include interface circuitry, control and/or level-shifting logic for local buses such as RS-485, Universal Serial Bus (USB), IEEE 1394, or other communication links.

Computer system 600 is coupled to a communication interface 616 that provides a link (e.g., at a physical layer, data link layer,) between the system bus 601 and an external communication link. The communication interface 616 provides a network link 618. The communication interface 616 may represent an Ethernet or other network interface card (MC), a wireless interface, modem, an optical interface, or other kind of input/output interface.

Network link 618 provides data communication through one or more networks to other devices. Such devices include other computer systems that are part of a local area network (LAN) 626. Furthermore, the network link 618 provides a link, via an internet service provider (ISP) 620, to the Internet 622. In turn, the Internet 622 may provide a link to other computing systems such as a remote server 630 and/or a remote client 631. Network link 618 and such networks may transmit data using packet-switched, circuit-switched, or other data-transmission approaches.

In operation, the computer system 600 may implement the functionality described herein as a result of the processor executing code. Such code may be read from or stored on a non-transitory computer-readable medium, such as memory 610, ROM 608, or storage device 606. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 618 (e.g., following storage in an interface buffer, local memory, or other circuitry).

It should be understood that the foregoing has presented certain embodiments of the invention but they should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that any trademarks appearing herein are the property of their respective owners and used for identification and descriptive purposes only, and not to imply endorsement or affiliation in any way.

The invention claimed is:

1. In a method performed at a server for admitting a user agent from a waiting room to a website, where the waiting room comprises a web page including code that provides a user experience, and the waiting room is provided based at least in part to mitigate load on website infrastructure, and furthermore where the server receives a first request from the user agent for admission to the website,
   responsive to the first request, directs the user agent to the waiting room by serving the web page of the waiting room,
   receives a second request from the user agent for admission to the website,
   applies a probability value configured for the website to determine whether to admit the user agent to the website, upon determining not to admit the user agent, serves a response that causes the user agent to remain in the waiting room, and
   upon determining to admit the user agent, selves content on the website desired by the user agent, said content being distinct from the web page of the waiting room;
   responsive to the first request, storing a cookie on the user agent with a value, the value being indicative of when the user agent was directed the waiting room;
   subsequently, upon receiving the cookie with the second request by the user agent for admission to the website, calculating a wait time indicator based at least in part on the value stored in the cookie; and
   deriving the probability value for admitting the user agent in response to the second request by applying a probability function that is configured for the website, the probability function taking the wait time indicator as input and producing an output comprising the probability value, which varies depending on the wait time indicator.

2. The method of claim 1, further comprising: receiving a definition of the probability function from a website provider and via a user interface.

3. The method of claim 1, further comprising;
   receiving, from a website provider and via a user interface, a maximum waiting time; and
   providing the probability function for the website as a monotonically increasing function of wait time indicator values, such that upon the wait time indicator reaching the maximum waiting time, the probability value is 100 percent.

4. The method of claim 1, further comprising;
   changing the probability function configured for the website based at least in part on any of: (i) current load on the website infrastructure, (ii) a confidence score relating to whether the user agent is a bot.

5. The method of claim 4, wherein the probability function's slope is inversely related to the load on the website infrastructure.

6. The method of claim 4, further comprising:
   changing the probability function configured for the website based at least in part on (i) current load on the website infrastructure.

7. The method of claim 1, wherein the value comprises any of: a timestamp, a segment identifier, and a count of requests for the user agent.

8. The method of claim 1, wherein the wait time indicator comprises any of: (i) a time, (ii) a time segment.

9. The method of claim 1, wherein the wait time indicator is calculated based at least in part on the value stored in the cookie and a time at which the second request is received.

10. In an apparatus comprising a server for admitting a user agent from a waiting room to a website, where the waiting room comprises a web page including code that provides a user experience, and the waiting room is provided at least in part to mitigate load on website infrastructure, and furthermore where the server is operable to:
    receive a first request from the user agent for admission to the website,
    responsive to the first request, direct the user agent to the waiting room by serving the web page of the waiting room,
    receive a second request from the user agent for admission to the website,
    apply a probability value configured for the website to determine whether to admit the user agent to the website, upon determining not to admit the user agent, serves a response that causes the user agent to remain in the waiting room, and
    upon determining to admit the user agent, serve content on the website desired by the user agent, said content being distinct from the web page of the waiting room;
    responsive to the first request, store a cookie on the user agent with a value, the value being indicative of when the user agent was directed the waiting room;
    subsequently, upon receiving the cookie with the second request by the user agent for admission to the website, calculate a wait time indicator based at least in part on the value stored in the cookie; and
    derive the probability value for admitting the user agent in response to the second request by applying a probability function that is configured for the website, the probability function taking the wait time indicator as input and producing an output comprising the probability value, which varies depending on the wait time indicator,
    wherein the server comprises circuitry' forming at least one processor and memory' holding computer program instructions for execution on at least one processor for operating the server as specified above.

11. A non-transitory computer readable medium holding computer program instructions for execution on one or more hardware processors, the computer program instructions comprising instructions for performing a method, the method performed at a server for admitting a user agent from a waiting room to a website, where the waiting room comprises a web page including code that provides a user experience, and the waiting room is provided at least in part to mitigate load on website infrastructure, and furthermore where the server:

receives a first request from the user agent for admission to the website,    responsive to the first request, directs the user agent to the waiting room by serving the web page of the waiting room,    receives a second request from the user agent for admission to the website,    applies a probability value configured for the website to determine whether to admit the user agent to the website,    upon determining not to admit the user agent, serves a response that causes the user agent to remain in the waiting room, and    upon determining to admit the user agent, serves content on the website desired by the user agent, said content being distinct from the web page of the waiting room;

responsive to the first request, storing a cookie on the user agent with a value, the value being indicative of when the user agent was directed the waiting room;

subsequently, upon receiving the cookie with the second request by the user agent for admission to the website, calculating a wait time indicator based at least in part on the value stored in the cookie; and    deriving the probability value for admitting the user agent in response to the second request by applying a probability function that is configured for the website, the probability function taking the wait time indicator as input and produces an output comprising the probability value, which varies depending on the wait time indicator.

\* \* \* \* \*